Figure 1:
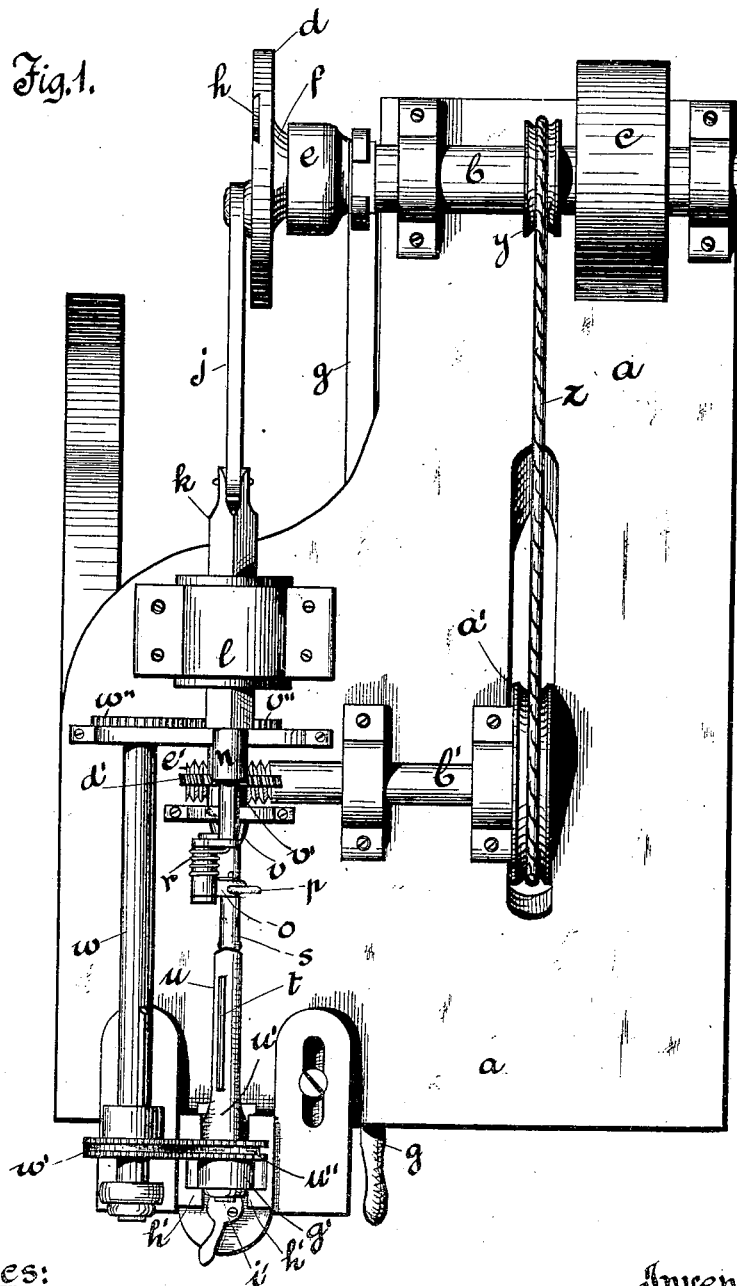

(No Model.) 2 Sheets—Sheet 1.

W. O. WAY.
BURNISHING MACHINE.

No. 245,243. Patented Aug. 2, 1881.

Witnesses:
John Richter
James J. Greene.

Inventor:
W. O. Way.
By W. E. Simonds
Atty

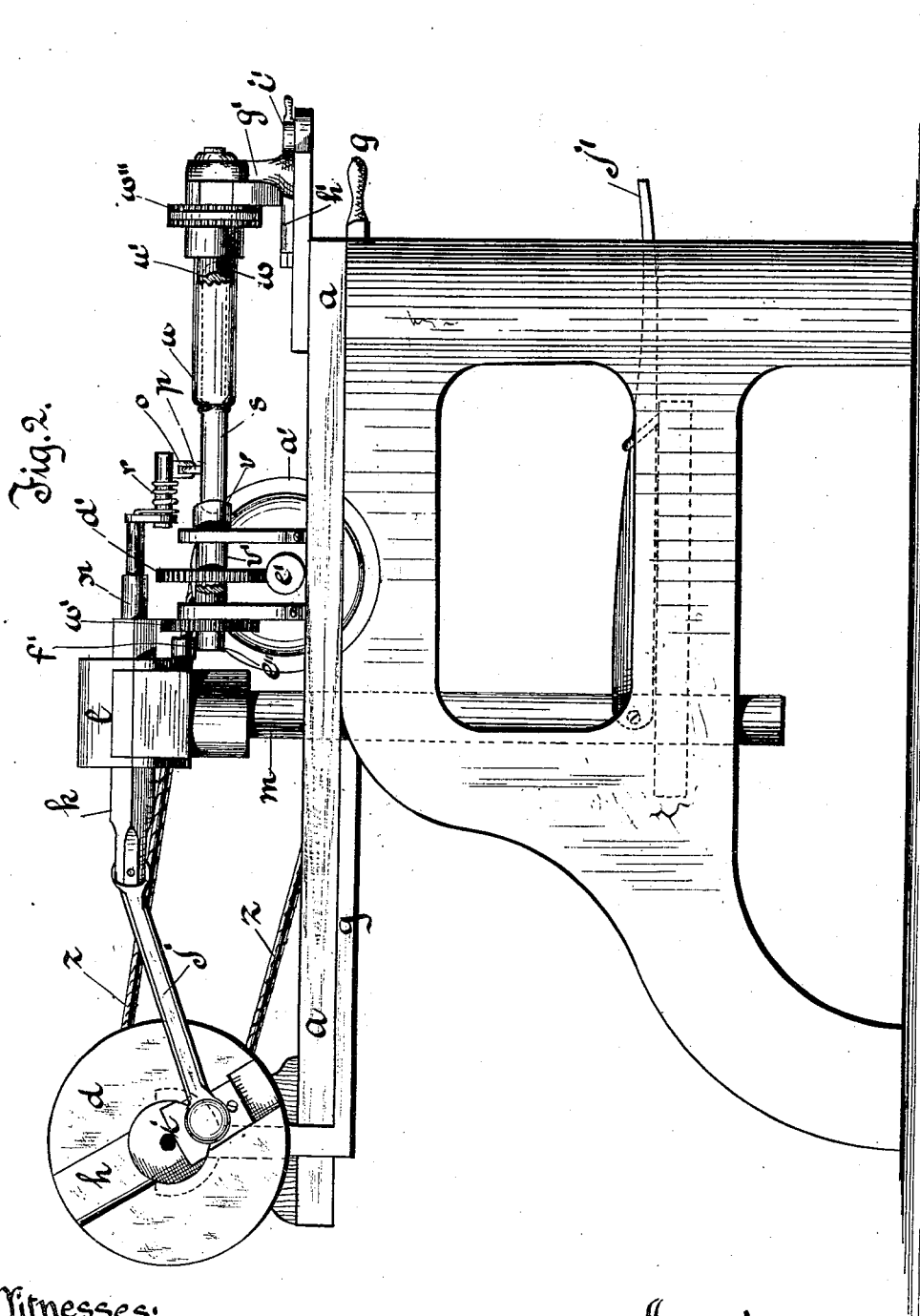

UNITED STATES PATENT OFFICE.

WILLIAM O. WAY, OF BUCKLAND, CONNECTICUT.

BURNISHING-MACHINE.

SPECIFICATION forming part of Letters Patent No. 245,243, dated August 2, 1881.

Application filed November 22, 1880. (No model.)

*To all whom it may concern:*

Be it known that I, WM. O. WAY, of Buckland, in the county of Hartford and State of Connecticut, have invented a new and useful Improvement in Burnishing Machinery, whereof the following is a specification, reference being had to the accompanying drawings, where—

Figure 1 is a top view. Fig. 2 is a side view.

The object of the invention is the production of a machine for burnishing a class of articles of which an ordinary oval metallic knife-handle is a type. The article rotates while being burnished, and the burnisher travels back and forth along the length of the article meanwhile.

The invention consists in an arrangement, organization, and combination of parts which adapt them to perform the purpose indicated in the manner indicated.

The letter $a$ denotes the table bearing the main part of the mechanism, supported on suitable legs. At the rear thereof, hung in suitable bearings, is the main shaft $b$, to which power and rotation may be applied by a belt running on pulley $c$. This shaft bears loose thereon the crank-disk $d$, which may be made to rotate with the shaft by means of the friction-clutch $e$, fast rotarily, but loose longitudinally, on the shaft, having a conical cup or opening in its side co-operating with a part-cone, $f$, borne upon the disk and moved to engage with and disengage from said part-cone by means of a lever, $g$, pivoted to the under side of the table, its front end suitably situated to be manipulated by the operator, and its rear end forked to take hold of the clutch. The outer face of the crank-disk bears a radial or diametric dovetail groove, $h$, in which is a crank-pin block, $i$, which may be adjusted radially in the groove, so as to give a greater or less length of stroke to the burnisher.

A pitman, $j$, is pivoted to (the pin on) the crank-pin block, and is pivoted at the other end to the piston $k$, whereby a longitudinal reciprocating motion is imparted to the piston. The piston $k$ is square or otherwise polygonal in cross-section, so that it may not rotate in the sleeve $l$, which sleeve is borne upon a pillar, $m$, hung in bearings, which permit the pillar, and with it the sleeve $l$, to rise and fall, for purposes hereinafter set forth. On a short shaft $n$, at the end of piston $k$ there is rotarily hung the burnish-arm $o$, bearing the wheel-burnisher $p$, which is pressed to contact with the work by helical spring $r$. The work or piece of stock represented as being burnished in the machine shown in the drawings is a knife-handle, substantially oval in cross-section. The letter $s$ denotes the knife-handle, and $t$ the knife-blade, which is inserted in the socket $u$, which is a part of, or is fixed to, the shaft $w'$. The end of the handle rests in a socket, $v$, which is a part of, or is fixed to, the shaft $v'$. The shaft $w'$ bears the gear $w''$, and the shaft $v'$ bears the gear $v''$, which gears respectively mesh into the gears $w'$ and $w''$ on the back gear-shaft $w$, whereby the rotation of the two sockets is made synchronous. The requisite rotation of the sockets is given from the main shaft $b$ through the medium of pulley $y$, band $z$, pulley $a'$, shaft $b'$, worm $c'$, and spur-wheel $d'$.

From the description, so far as given, it is apparent that while the burnisher reciprocates the knife-handle will gradually rotate, and thereby the handle will be burnished on all sides; but it is desirable that the requisite up and down movements of the sleeve $l$ should not depend upon the contact of the burnisher with the knife-handle. To avoid this the end of shaft $v'$ is provided with a cam or former, $e'$, of a shape in cross-section approaching the cross-section shape of the knife-handle, which cam or former rotates with the shaft $v'$, and the sleeve $l$ rests upon this former, through the medium of the friction-roll $f'$, so that the sleeve $l$ will be appropriately moved up and down by the rotation of this former.

The standard $g'$, in which shaft $w'$ is hung, is set in ways $h'$, in which it has some slight movement, to permit of inserting the end of the knife-handle in and withdrawing it from the socket $v$, and a cam, $i'$, bearing against this standard locks the knife in position for being burnished.

By means of lever $j'$ the sleeve $l$ may be raised and the burnisher be thereby lifted off the work, when desired.

Although I have described this machine as applied to the burnishing of a knife-handle, it is obvious that it may, without change in principle, but with obvious changes to adapt it to particular shapes, be applied to the burnishing of bodies which are round, oval, polygonal, or the like, the changes required in such cases being in the shape of the former, and, possibly, of the sockets, which receive the ends of the stock or work. It is also obvious that in those cases where the work or stock is sufficiently solid and strong it is necessary to apply rotative power to only one of the sockets.

I claim as my invention—

1. The combination of the longitudinally-reciprocating piston $k$ with the burnisher-bearing arm $o$, hung rotarily thereon transversely of the line of its reciprocation, substantially as described, and for the purpose set forth.

2. The combination of the longitudinally-reciprocating piston $k$, the burnisher-bearing arm $o$ hung rotarily thereon, and the stock socket or sockets rotating transversely of the line of the piston's reciprocation, substantially as described, and for the purpose set forth.

3. The combination of the rotary former, the movable sleeve, the reciprocating and burnisher-bearing piston, and the rotating stock socket or sockets, substantially as shown and described.

WM. O. WAY.

Witnesses:
WM. E. SIMONDS,
J. J. GREENE.